US007925636B2

(12) United States Patent
Pospisil et al.

(10) Patent No.: US 7,925,636 B2
(45) Date of Patent: Apr. 12, 2011

(54) REPOSITORY SYSTEM AND METHOD

(75) Inventors: Radek Pospisil, Neratovice (CZ);
Tomas Vocetka, Prague (CZ); Albert Regner, Prague (CZ)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 11/808,318

(22) Filed: Jun. 8, 2007

(65) Prior Publication Data

US 2008/0306992 A1    Dec. 11, 2008

(51) Int. Cl.
*G06F 17/00* (2006.01)
*G06F 7/00* (2006.01)

(52) U.S. Cl. .................. 707/690; 707/803; 707/809
(58) Field of Classification Search .................. None
See application file for complete search history.

(56) References Cited

U.S. PATENT DOCUMENTS

| | | | | | |
|---|---|---|---|---|---|
| 5,717,924 | A | * | 2/1998 | Kawai | 707/102 |
| 5,794,030 | A | * | 8/1998 | Morsi et al. | 707/999.1 |
| 6,216,136 | B1 | * | 4/2001 | Ronstrom | 707/999.101 |
| 6,631,519 | B1 | * | 10/2003 | Nicholson et al. | 717/169 |
| 6,772,180 | B1 | * | 8/2004 | Li et al. | 715/229 |
| 6,792,605 | B1 | * | 9/2004 | Roberts et al. | 719/313 |
| 7,496,596 | B2 | * | 2/2009 | Li et al. | 707/102 |
| 7,543,019 | B1 | * | 6/2009 | Cormier | 709/203 |
| 7,620,936 | B2 | * | 11/2009 | Ernst et al. | 717/108 |
| 2002/0049738 | A1 | * | 4/2002 | Epstein | 707/1 |
| 2003/0182308 | A1 | * | 9/2003 | Ernst et al. | 707/103 Z |
| 2004/0194016 | A1 | * | 9/2004 | Liggitt | 715/501.1 |
| 2005/0071359 | A1 | * | 3/2005 | Elandassery et al. | 707/102 |
| 2006/0031811 | A1 | * | 2/2006 | Ernst et al. | 717/100 |
| 2006/0085465 | A1 | * | 4/2006 | Nori et al. | 707/101 |
| 2006/0184926 | A1 | * | 8/2006 | Or et al. | 717/168 |
| 2006/0265702 | A1 | * | 11/2006 | Isaacson et al. | 717/168 |
| 2006/0265706 | A1 | * | 11/2006 | Isaacson et al. | 717/174 |
| 2006/0277542 | A1 | * | 12/2006 | Wipfel | 717/174 |
| 2006/0294120 | A1 | * | 12/2006 | Li et al. | 707/100 |
| 2007/0220065 | A1 | * | 9/2007 | Coyle et al. | 707/203 |
| 2008/0127175 | A1 | * | 5/2008 | Naranjo et al. | 717/174 |
| 2008/0172400 | A1 | * | 7/2008 | Koronthaly | 707/100 |
| 2008/0243874 | A1 | * | 10/2008 | Suthar et al. | 707/100 |
| 2009/0037462 | A1 | * | 2/2009 | Pearson et al. | 707/103 Y |
| 2009/0119319 | A1 | * | 5/2009 | Li et al. | 707/100 |
| 2009/0327302 | A1 | * | 12/2009 | Richardson et al. | 707/10 |
| 2010/0242034 | A1 | * | 9/2010 | Rugh et al. | 717/172 |

OTHER PUBLICATIONS

Fielding, R.T. "Architectural Styles and the Design of Network-Based Software Architectures", Ph.D. Dissertation, University of California, Irvine, 2000.*
Lerner, B.S. and A.N. Habermann "Beyond Schema Evolution to Database Reorganizations", Proceedings of the 1990 Joint ACM OOPSLA/ECOOP Conference on Object-Oriented Programming: Systems, Languages and Application, Oct. 21-25, 1990, pp. 67-76.*

(Continued)

*Primary Examiner* — Luke S Wassum

(57) ABSTRACT

A repository has a database containing a number of artifacts storing data and a system device model defining various entities, including the artifacts and properties used in the artifacts. To update a system device model in database an extension package is passed to the repository. Update software identifies differences introduced by the extension package that are only permitted if the data in the artifacts is compatible and updates the database if and only if the data and extension package are compatible.

18 Claims, 4 Drawing Sheets

OTHER PUBLICATIONS

Lerner, B.S. "Type Evolution Support for Complex Type Changes", University of Massachusetts, Department of Computer Science, Technical Report 94-71, Oct. 31, 1994.*

Clamen, S. "Schema Evolution and Integration", Distributed and Parallel Databases, vol. 2, 1994, pp. 101-126.*

Peters, R.J. and M.T. Özsu "Axiomatization of Dynamic Schema Evolution in Objectbases", Proceedings of the 11th International Conference on Data Engineering, Mar. 6-10, 1995, pp. 156-164.*

\* cited by examiner

REPOSITORY SYSTEM AND METHOD

FIELD OF THE INVENTION

The invention relates to a method, apparatus, and computer program product that acts as a repository, particularly but not exclusively a stateless repository.

BACKGROUND OF THE INVENTION

There has been considerable interest in recent times in the provision of web services, i.e. the provision of services on the internet that do not simply provide web pages for display to human users.

One approach that has been adopted to deal with this situation is a registry or repository for defining aspects of web-available services. For example, the universal description discovery and integration (UDDI) standard defines an extended markup language (XML) based registry that allows services to be published with details about the service provided. Such registries can be interrogated for further information which may, for example, include web service description language (WSDL) documents defining web services, including protocol bindings and message formats. The registry will normally be interrogated by messages in a standard format, such as the SOAP format (formally an abbreviation of Simple Object Access Protocol), or other suitable formats.

There are a number of models for exchanging data from a server with the data to a client to which the data is provided. In a traditional client-server approach, all of the information about the data format is hidden from the client, that is to say encapsulated.

A development of this approach is known as the Representational State Transfer (REST) approach, in which an artifact is transferred from a server to a client using one of a number of standard data types. The data type used for the transfer may be selected dynamically, for example based on the capability or desire of the client and the nature of the artifact. The representation may include instructions in a standard format, for example Java instructions where the client is known to support Java.

The interface does not reveal whether the data type used for the transfer is the format stored by the server to store the data, or merely a derivation of that format, so in this sense there is encapsulation.

The REST approach is a stateless approach, that is to say the server does not store the state of the session with the client. The session state is therefore kept only on the client.

BRIEF DESCRIPTION OF THE DRAWINGS

Embodiments will now be described, purely by way of example, with reference to the accompanying drawings, in which.

The drawings are purely schematic and not to scale.

DETAILED DESCRIPTION

Figure 1:
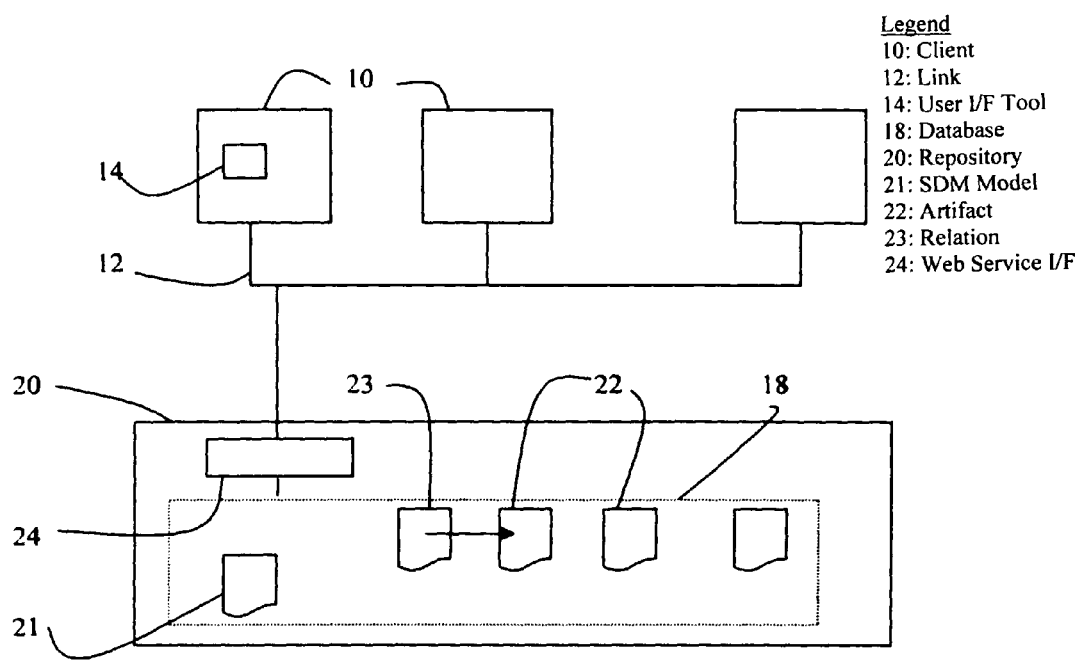
FIG. 1 shows a schematic of apparatus including a repository.

Referring to FIG. 1, one or more clients 10 are connected via links 12 to a server 20 including a database 18.

The unit of stored data is an artifact 22, which may be thought of as a general object, or resource, in general containing data, code, or some defined mixture. The artifact 22 is the access unit for the contents of the database, and each request received from a client 10 returns only one artifact 22.

The definitions of the artifacts are stored in a special file in the repository, namely a SOA definition model (SDM) 21, or object model, which is in the form of a document which stores format details of a number of different types of artifacts. The SDM will also be referred to simply as the definition model. In the embodiment, the SDM is an XML document defining a number of artifacts and attributes of the artifacts which will be referred to as properties. The abstract definition of a property of an artifact will be referred to as a property descriptor.

Each artifact is defined in the SDM 21 to have one or more properties, which may be either required or optional. Required properties, for example, may include a name of the artifact and a unique numeric ID.

Optional properties may include, for example, a geographic location property defining the geographic location that created a particular instance of the artifact may be defined as optional.

The database 18 stores in addition to the SDM model 21 instances of artifacts 22 compliant with the definitions in the SDM model 21. Relations 23 between instances of the artifacts are indicated schematically using arrows. The relations 23 are from a source artifact to a target artifact, and are considered to be properties of both the source artifact and the target artifact.

Figure 2:
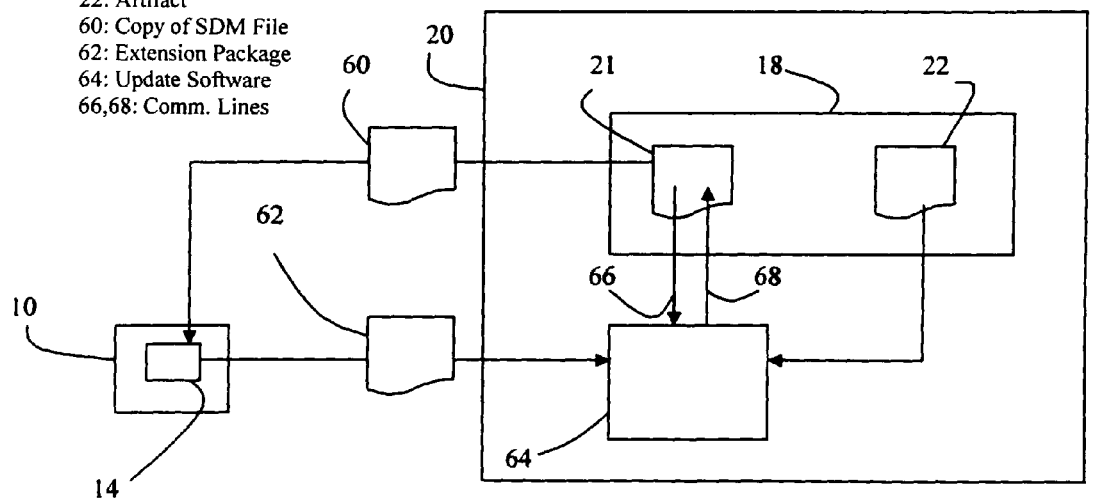
FIG. 2 illustrates the flow of data in the apparatus of FIG. 1.
Figure 3:
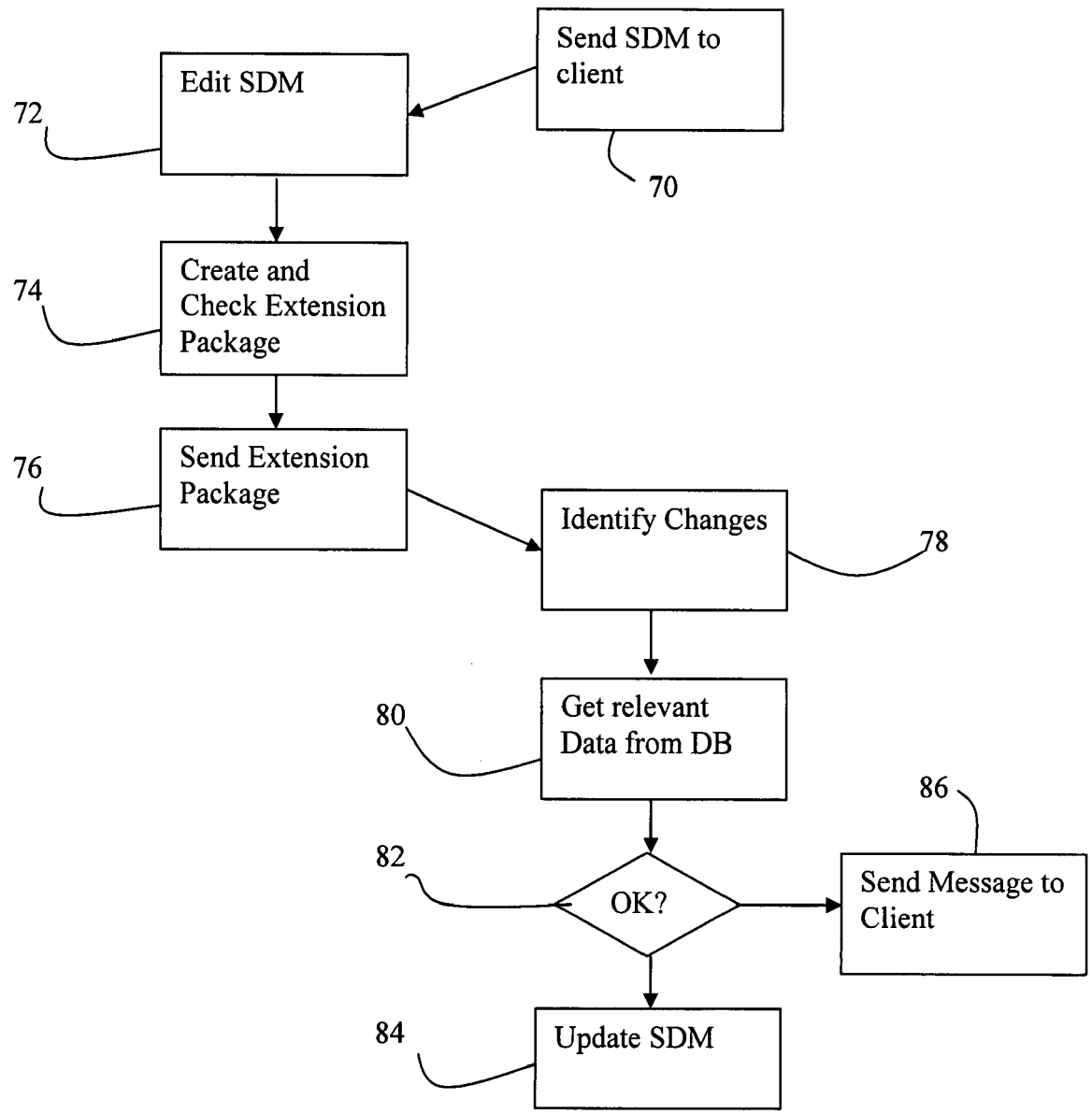
FIG. 3 illustrates a method according to an embodiment.

As will be appreciated, it is normally necessary to update the data model from time to time in order to cope with changes in business process or the data that is collected. However, such updates may cause incompatibility issues with data already in the database. Referring to FIGS. 2 and 3, an embodiment illustrating updating the SDM 21 will now be described, which takes account of these issues.

Firstly, a copy 60 of the SDM file 21 is sent 70 from the repository 20 to the client 10. The client 10 includes the software for editing the SDM. The embodiment uses XML, so the client software may be as simple as text editor, but a bespoke SDM model editor may also be used.

The user updates 72 the SDM model 21 on a client 10. During this process, initial checks on the validity of the updates to the SDM 21 are performed.

When the user has made the desired amendments, the user can the upload the changes to the database 18 by creating 74 an extension package 62 and sending it 76 to update software 64 located in the repository 20. The creating step 74 also includes a number of validity checks on the extension package 62 which is not created if it is internally inconsistent or inconsistent with the remaining, unchanged portions of the SDM 21. In the embodiment the extension package is a Java Archive (JAR) file.

The update software 64 then carries out a number of checks, based on information provided to it via communication lines 66 and 68 that provide bidirectional communications between the update software 64 and the SDM 21.

Firstly, the update software identifies 78 the changes in the extension package and classifies each change as a compatible change, a non-compatible change, or a non-allowed change.

Compatible changes are those changes that are allowed regardless of the contents of the artifacts 22 stored in the database 18. The set of compatible changes include changes of addition, that is to say:

adding a new SDM entity;

modifying an existing SDM entity by addition, for example adding a new property to an artifact.

The set of possible compatible changes also includes modification, i.e.

modifying an SDM entry in a way that does not have an effect on data. In particular, instead of deleting an SDM entry it is possible to deprecate it.

Such changes are allowed changes regardless of the content of the database.

Non-compatible changes are changes that may or may not be allowed depending on the content of the database. These include:

changing a property descriptor narrowing the allowed range of values taken by a property;

changes in the numbers of specific properties required by the artifact;

the removal of a property from an artifact; and a removal of a property from the whole model; or a removal of an artifact from the model.

Some changes may simply be non-allowed regardless of the state of the database. These include changes to any definition in the SDM file that conflicts with other parts of the SDM file. For example, changing the categorization of an object in an object taxonomy is non-allowed—once the object has been categorised, it will have this value and cannot be changed.

The update software 64 identifies non-compatible changes, and then gets data 80 from the database 18 to check whether there are any instances of artifacts not compatible with the changes.

The check 82 is performed—if there are no incompatibilities, the update software 62 updates 84 the SDM file 21 in the repository 20. If there is any incompatibility, the update software 62 returns 86 a message to the client 10 indicating failure, and also indicating the reasons for that failure.

Thus, by providing a limited but still useful number of changes to the model, that may be made using the update file, the possibility exists for users or programmers to update the SDM model in a controlled and reliable way without risking data incompatibility with the contents of the database. This allows for changes to the model 21 to be introduced even after the database is in use, i.e. populated with data.

In the above example, a predetermined set of non-compatible changes to the SDM 21 is permitted if and only if the content of the database is appropriate.

In other examples, the predetermined set of changes may vary slightly with suitable adjustments to the checks.

A particular example will now be described in more detail. In the particular example, the SDM model is an XML file which contains a number of the following entities, as appropriate.

Firstly, the SDM model includes taxonomy descriptors, which describe taxonomies used for categorizing property descriptors (see below).

Secondly, the SDM model includes predetermined property types, i.e. base types such as string, integer, and other types that may be used for properties.

Thirdly, the SDM model includes property descriptors, i.e. descriptors specifying for each property the type of values stored by the property, whether a taxonomy or a property type, as well as further information such as XML serialisation and value range if required.

Fourthly, the SDM model includes artifact descriptors, declaring XML serialisation and a list of properties for artifacts. Some artifacts can be abstract, i.e. instances of the artifact are used as base classes for other artifacts. The properties are defined as being required, where a single instance of the property must be defined for the artifact, optional, if the property is optional, or multiple, if plural instances of the property are possible.

Fifthly, the SDM model can include artifact taxonomies, relating the artifact to other artifacts, possibly using inheritance.

The client software in the embodiment is a user interface tool 14 (FIG. 1) that takes the existing SDM 21 from the repository 20. As well as changing the model, the embodiment of the user interface tool 14 also allows changing taxonomies, configuration files, and Java code contained in artifacts 22 in the database.

The tool permits only certain changes to the SDM 21, namely the changes discussed above as being compatible or non-compatible, not changes that are not allowed regardless of the content of the database.

Note that the list of non-compatible changes includes changing a property from optional or required to multiple, from multiple to optional or required, or from optional to required.

Once the changes have been created on the tool 14, they are returned to the repository for updating the SDM file in the repository.

A particular feature of the invention is that the extension packages can be used to update multiple instances of the repository. In particular, there may be multiple users of repository software in different organisations, all of which will wish to update their software and in particular the SDM 21 as improvements are made. The extension package 62 allows changes to be disseminated to a number of users in the form of the extension package 62 but only implemented by the user if their data is compatible with the extension package.

Further, the update software 64 in the repository may be configured to install multiple extension packages simultaneously.

Figure 4:
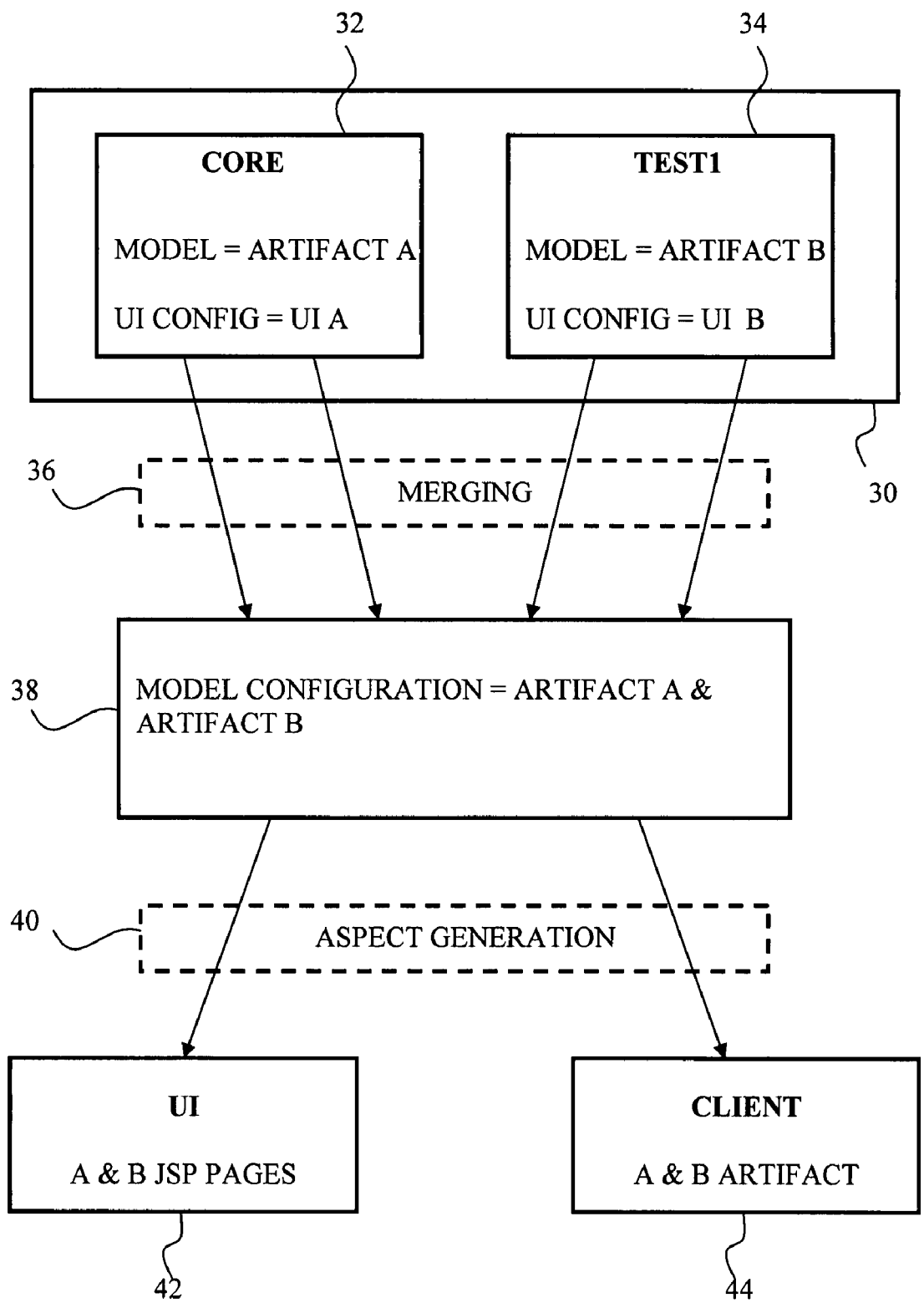
FIG. 4 illustrates an implementation of a method according to FIG. 3.

Conveniently, the existing SDM 21 is also configured as an existing package in the same format as extension package and the update software merges these two packages, as illustrated in FIG. 4.

In this approach, a core file 32 has both model information (SDM 21) and user interface information. The extension package is represented by extension file 34 which contains updates to the model information as well as updates to the user interface.

These are merged together by update software 64 in merge step 36 to produce a merged model file 36, subject to satisfactory testing as explained above.

The user interface is updated by its bindings to the SDM. So, if a new property is added a user interface configuration is added to allow it to be changed. Similarly, if an artifact or property is removed from the SDM, corresponding configuration options are removed from the user interface.

Then, the other features contained in the update file in addition to the model are also merged. In particular, in an aspect generation step 40, the update software 64 creates a merged (i.e. updated) user interface 42. The update software 64 also creates client packages 44 including code necessary for running on the client 10. In general, these other features will not directly use the database, although they may be dependent on changes to data in artifact properties, so in general the changes implemented in aspect generation step 40 are not tested against the data stored in the database in the same way as changes to the SDM.

In alternative embodiments, however, some permitted changes to the other features may potentially have conflicts with data in the database, and accordingly checks may be introduced for these changes also.

The server 20 is configured, in this example, as a REST repository which stores a plurality of artifacts 22. The repository is accessed through a web service interface 24 which in the example is a UDDI interface. In the example, the repository is accessed by http GET and POST instructions.

Figure 5:
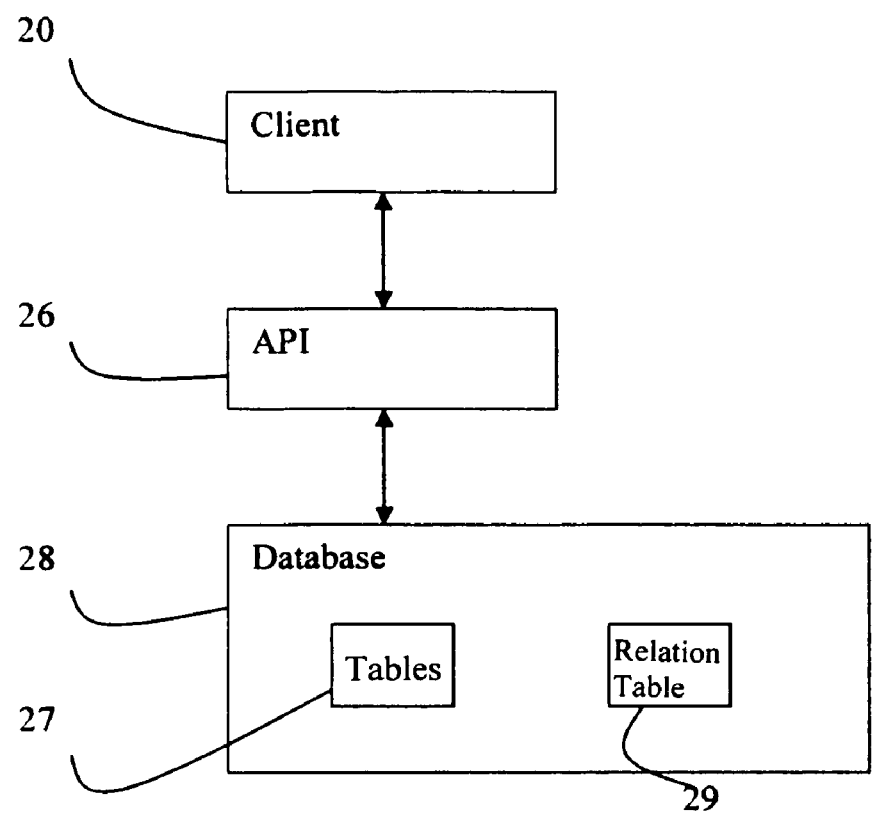
FIG. 5 illustrates an implementation of the apparatus of FIG. 1.

FIG. 5 illustrates schematically the way repository 20 is implemented. Underlying the repository is a database 28 which stores the data of the repository, for example in tables 27. Thus, the data is not stored, in the example, in the same XML format used to deliver data from the repository. In particular, relations 23 are described in relation table 29.

An application programming interface (API) 26 acts as an interface between the repository 20 and the database 28.

A number of instances of the artifact(s) defined in the SDM are created and stored in the database 18. As will be appreciated, there may be one, many or indeed no instances of any particular defined artifact stored in the database.

In the embodiment, the relations are stored in a separate table in the database storing all relations, and this table is separate from the remainder of the features of each artifact.

The client and repository and links between them may be implemented using standard computers and networks of computers using one or more data storage devices and one or more processors, as is known to those skilled in the art.

Those skilled in the art will realise that any alternative way of storing the data, for example in database tables, may be used instead. For example, the specific way in which data is stored in the repository can match exactly the format of the messages described. Indeed, the REST framework allows data to be stored in the repository in any convenient way as long as the artifact can be formatted correctly when returned to the client.

The invention claimed is:

1. A method, comprising:
   generating an extension package comprising information representing at least one change between a current object definition file and an updated object definition file;
   identifying each change represented in the extension package for which allowability depends on content of a database ("non-compatible change");
   checking each non-compatible change for allowability against objects in the database before modification via the extension package; and
   updating the current object definition file with the extension package to create a merged model file based on each non-compatible change being allowable.

2. A method according to claim 1, wherein:
   identifying further comprises identifying each change represented in the extension package for which allowability does not depend on the content of the database as either a "compatible change" or "non-allowable change";
   wherein compatible changes are always allowable and non-allowable changes are never allowable;
   wherein updating further comprises updating the current object definition file via the extension package based on the extension package not comprising a non-allowable change.

3. A method according to claim 2, wherein the current object definition file comprises an object model including at least one entity selected from the group consisting of:
   taxonomy descriptors, which describe taxonomies used for categorizing property descriptors;
   property types, which define base types of data;
   property descriptors, specifying for a plurality of properties the property type of that property;
   artifact descriptors, each specifying the properties of a respective object; and
   artifact taxonomies, specifying the logical structure of objects.

4. A method according to claim 3, wherein
compatible changes include:
   adding a new entity to the object model;
   adding a new property to an existing entity ; or
   modifying an object model entity in a way that does not have an effect on the database;
and the non-compatible changes include:
   narrowing the allowed range of values taken by a property;
   removing a property from an entity; and
   removing a property from the object model; or
   removing an artifact from the object model.

5. A method according to claim 4, wherein non-allowable changes comprise
   changing categorization of artifacts in the artifact taxonomy.

6. A method according to claim 1, wherein the extension package further includes at least one change to a user interface.

7. A method according to claim 1, wherein the extension package further includes at least one change to client software.

8. A repository, comprising:
   a database storing a plurality of artifacts, including a current object definition file; and
   update software for receiving an extension package containing changes to the artifacts in the current object definition file, checking the extension package against the artifacts in the database before modification via the extension package, and updating the object definition model based on the changes being allowable,
   wherein the update software merges the extension package with the current object definition file, so as to create a merged model file.

9. A repository according to claim 8, wherein
the current object definition file includes at least one entity selected from the group consisting of:
   taxonomy descriptors, which describe taxonomies used for categorizing property descriptors;
   property types, which define base types of data;
   property descriptors, specifying for a plurality of properties the property type of that property;
   artifact descriptors, each specifying the properties of a respective artifact; and
   artifact taxonomies, specifying the logical structure of artifacts.

10. A repository according to claim 9 comprising:
   definitions of allowable changes, each allowable change being defined to be either a "compatible change," which is allowed regardless of content of the database, or a "non-compatible change," for which allowability depends on content of the database.

11. A repository according to claim 10, wherein
compatible changes include:
   adding a new entity to an object model;
   adding a new property to an existing entity; or
   modifying the object model entity in a way that does not have an effect on the database;
and non-compatible changes include:
   narrowing the allowed range of values taken by a property;
   removing a property from an entity;
   removing a property from the object model; or
   removing an artifact from the object model.

12. A repository according to claim 8, wherein the update software removes at least one configuration option from a user interface based on at least one artifact removed from the extension package; and
   wherein the update software adds at least one configuration option to the user interface based on at least one artifact added to the extension package.

13. A method comprising:
   receiving an extension package comprising information representing at least one change between a current object definition file and an updated object definition file;
   merging the current object definition file with the extension package to create a merged model file;
   identifying each change represented in the extension package for which allowability depends on content of a database ("non-compatible change");
   checking each non-compatible change for allowability against the artifacts in the database before modification via the extension package; and
   updating the current object definition file using an updated system device model based on each non-compatible change being allowable.

14. A method according to claim 13, wherein the current object definition file includes at least one entity selected from the group consisting of:
   taxonomy descriptors, which describe taxonomies used for categorizing property descriptors;
   property types, which define base types of data;
   property descriptors, specifying for a plurality of properties the property type of that property;
   artifact descriptors, each specifying the properties of a respective artifact; and
   artifact taxonomies, specifying the logical structure of artifacts.

15. A method according to claim 13, wherein
   the compatible changes include:
      adding a new entity to an object model;
      adding a new property to an existing entity; or
      modifying the object model entity in a way that does not have an effect on the database;
   and the non-compatible changes include:
      changing a property descriptor changing the allowed range of values taken by a property;
      removing a property from an artifact;
      removing a property from the object model; or
   removing an artifact from the model.

16. A method according to claim 13, wherein the extension package further includes updates to a user interface.

17. A database update computer program product recorded on a computer readable medium, the computer program product including:
   code for generating an extension package comprising information representing at least one change between a current object definition file and an updated object definition file;
   code for identifying each change represented in the extension package for which allowability depends on content of a database ("non-compatible change");
   code for checking each non-compatible change for allowability against the objects in the database before modification via the extension package; and
   code for updating the current object definition file with the extension package to create a merged model file based on each non-compatible change being allowable.

18. A database update computer program product according to claim 17, wherein the extension package further includes updates to a user interface.

* * * * *

UNITED STATES PATENT AND TRADEMARK OFFICE
CERTIFICATE OF CORRECTION

| | |
|---|---|
| PATENT NO. | : 7,925,636 B2 |
| APPLICATION NO. | : 11/808318 |
| DATED | : April 12, 2011 |
| INVENTOR(S) | : Radek Pospisil et al. |

It is certified that error appears in the above-identified patent and that said Letters Patent is hereby corrected as shown below:

In column 6, line 8, in Claim 4, delete "entity ;" and insert -- entity; --, therefor.

Signed and Sealed this
Sixth Day of September, 2011

David J. Kappos
*Director of the United States Patent and Trademark Office*